United States Patent Office 3,560,485
Patented Feb. 2, 1971

3,560,485
Δ₂-PYRAZOLINE OPTICAL BRIGHTENERS
Erich Schinzel, Frankfurt am Main, Siegfried Bildstein, Keekheim, Taunus, and Karl Heinz Lebkucher, Hofheim, Taunus, Germany, assignors to Farbwerke Hoechst Aktiengesellschaft vormals Meister Lucius & Bruning, Frankfurt am Main, Germany, a corporation of Germany
No Drawing. Continuation of application Ser. No. 490,112, Sept. 24, 1965. This application Sept. 29, 1967, Ser. No. 671,606
Claims priority, application Germany, Sept. 25, 1964, F 44,060
Int. Cl. C07d 49/10; B44d 5/00
U.S. Cl. 260—239.8
6 Claims

ABSTRACT OF THE DISCLOSURE

Novel optical brightening agents for the treatment of fibrous materials and films, processes for their use and detergent compositions containing them.

This application is a continuation of our earlier application Ser. No. 490,112 filed Sept. 24, 1965 now abandoned.

This invention relates to novel optical brightening agents for the treatment of fibrous materials and films, to processes for their use and to detergent compositions containing them.

It is already known that for the optical brightening of fibrous materials, films and the like, fluorescent 1,3-diaryl-Δ₂-pyrazoline compounds or 1,3,5-triaryl-Δ₂-pyrazoline compounds which may carry various substituents can be used.

It has now been found that new Δ₂-pyrazoline derivatives as defined below are particularly valuable as optical brighteners. The novel Δ₂-pyrazoline derivatives of this invention, which are substantially colorless or slightly yellow, can be represented by the general formula (A) 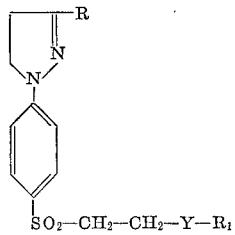

$SO_2-CH_2-CH_2-Y-R_1$ in which R is an aromatic radical, especially a phenyl radical and, preferabily, a p-chlorophenyl radical, Y stands for an oxygen or a sulfur atom and $R_1$ represents an alkyl radical with preferably 1 to 5 carbon atoms which is substituted by N,N-di-lower-alkylamino, quarternary tri-lower-alkyl-ammonium methosulfate, carboxy, carbo-lower-alkoxy, piperidino or piperidinium methosulfate, or phenyl substituted by carboxy or carbo-lower-alkoxy.

Of particular advantage are compounds of the Formula A in which $R_1$ represents an alkyl radical substituted by a carboxy group or an N,N-dialkylamino group.

The Δ₂-pyrazolines of the general Formula A to be used as optical brighteners according to the present invention, can be produced according to various methods.

A preferred way of preparing them is the reaction of a vinylsulfone compound of the general Formula B (B) 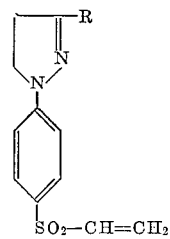

$SO_2-CH=CH_2$ wherein R has the meaning given above, with an excess of an aliphatic or an aromatic hydroxyl- or mercapto compound. Generally, the addition reaction is carried out in an organic solvent at an elevated temperature of up to about 150° C. in the presence of an alkaline agent.

As hydroxy- or mercapto-compounds, there are mentioned; thioglycolic acid, thioglycolic acid methyl ester, thioglycolic ethyl ester, dimethylamino-ethanol, diethyl-amino-ethanol, di-n-butylamino - ethanol, 1 - dimethyl--amino-propanol-2, N - β - hydroxyethyl-piperidine, 2 - carboxy-thiophenol, 4-carboxy-thiophenol, 2-carbo-methoxy-thiophenol, 2-carbethoxy-thiophenol, and 2,4-dicarboxy-thiophenol.

As vinyl-sulfone compounds of the general Formula B there are named, for instance, those wherein the radical R represents a phenyl radical or halogenated phenyl radical, for instance, 4-bromophenyl-3,4-dichloro-phenyl. In general, especially favorable results are obtained with compounds in which R represents a phenyl radical or a p-chlorophenyl radical. A further method of preparation consists in the condensation of 4-(β-alkoxy- or phenoxy-ethyl-sulfonyl)-phenyl-hydrazines or of the corresponding thio-ethers with ω-chloropropiophenones which may be substituted, in order to obtain the Δ₂-pyrazolines of the general Formula A.

Compounds of the general Formula A containing in the radical $R_1$ a quaternary trialkyl-ammonium group can be obtained, for instance, by causing dimethylsulfate to act on the corresponding N,N-dialkylamino compounds. The new compounds are distinguished by an excellent fluorescent power and a good fastness to light, when used for the brightening of organic fibrous materials, for instance of cotton, cellulose acetate, above all, however, of wool, polyamide, polyacrylonitrile and its copolymers. The brighteners obtained according to the invention can be used in known manner in the form of solutions in water, dilute organic and inorganic acids or in organic solvents, or in the form of dispersions if necessary with the aid of dispersing agents. The required quantities, which may vary within wide limits, may easily be ascertained by preliminary tests.

The new compounds can be added to commercial detergents, even if the latter contain oxydative bleaching agents, such as, for instance, perborate, in order to improve the appearance of the washed goods. Amounts of from about 0.001 to about 1% of the new Δ₂-pyrazoline compounds calculated on the weight of the detergent composition may be used. Furthermore, the new compounds can be used together with reductive chemical bleaching agents, for instance, sodium dithionite, sodium boron hydride and the like. The new substances can be used in combination with appropriate textile auxiliary agents such as antistatics, plasticizers, hydrophobizing agents and the like, whereby very good brightening and finishing efforts are attained by one operation phase only.

Another field of application of the above-described substances is their use in dye-baths. When operating in this way, vivid, brilliant tints are attained which are especially desired in the case of pastel shades. Furthermore, they may be added to spinning and moulding masses, for instance of the above-mentioned man-made fibrous materials or polymerization products of vinyl-chloride, vinylidene chloride, polyethylene, polypropylene and especially polyamide as nylon 6, or nylon 66, polyacrylonitrile and its copolymers, and the like, used for the production of synthetic fibers, filaments, foils, bands and other shaped structures.

The following examples serve to illustrate the invention but they are not intended to limit it thereto; the parts being by weight.

EXAMPLE 1

A bleached protein fabric is treated at a goods-to-liquor ratio of 1:20 with 0.6% (referred to the weight of the goods) of an aqueous dispersion of the compound corresponding to the formula (I)
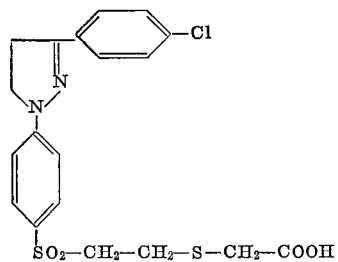

and 2% of formic acid (85% strength). The goods brightened in this manner show a pleasant clear white shade. The remission of light measured in the present and in the following examples by means of a Zeiss-Elrepho instrument at a wave length of 460 m$\mu$ (MgO=100%) upon said treatment is increased by 16% in comparison with non-treated goods.

The compound I mentioned in Example 1 can be produced in the following manner:

Into a mixture of 60 parts of methanol, 3 parts of sodium methylate and 5 parts of thioglycolic acid of 80% strength, 10.5 parts of 1-(4'-vinylsulfonyl-phenyl)-3-p-chlorophenyl-$\Delta_2$ pyrazoline of a melting point of 190–192° C. are introduced at room temperature and with stirring. The mixture is heated to 65–70° C. and this temperature is maintained for 90 minutes. After cooling, a solution of 10 parts of glacial acetic acid in 100 parts of water is added, the separting reaction product is filtered off with suctioon, washed with water and dried at 60° C. under reduced pressure. 11.5 parts of the compound I are obtained which after having been recrystalized several times from n-butanol and o-dichlorobenzene melt at 182–184° C.

EXAMPLE 2

A bleached protein fabric is treated for 30 minutes at 60° C. at a goods-to-liquor ratio of 1:20 with 1.2 g./liter of sodium-dithionite,
0.8 g./liter of sodium-pyrophosphate and
0.5 g./liter of an aqueous dispersion of the compound (II)
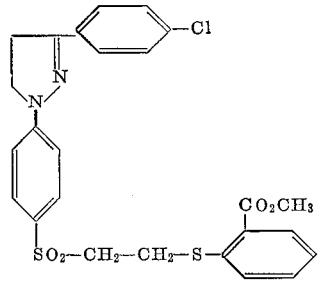

and then rinsed cold. The degree of whiteness of the fabric is increased by this treatment from 74 to 80%. The compound II can be obtained in the following manner:

Into a mixture of 200 parts of methanol, 4 parts of sodiummethylate and 11.5 parts of thiosalicylic acid methyl ester there are introduced at room temperature and while stirring 24 parts of 1-(4'-vinylsulfonyl-phenyl)-3-p-chlorophenyl-$\Delta_2$-pyrazoline having a melting point of 190–192° C. The mixture is heated to 65–70° C. and this temperature is maintained for 90 minutes. The mixture is then cooled to 5–10° C., the reaction product crystallizing out is filtered off with suction, washed with water until showing a neutral reaction and dried at 60° C. under reduced pressure. 32.5 parts of compound II are obtained, which after repeated recrystallization from toluene melt at 167–168° C.

EXAMPLE 3

In order to produce a more pleasant and brilliant tint, a bleached protein fabric is dyed at a goods-to-liquor ratio of 1:20 with 1 g./liter of an addition product of one mol of nonyl-phenol and 10 mols ethylene oxide,
2 ml./liter of glacial acetic acid,
0.05 g./liter of the dyestuff of the following constitution

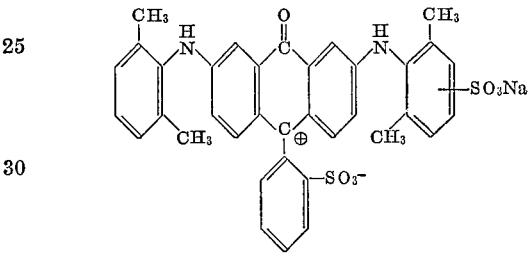

1 g./liter of an aqueous dispersion of compound III (cf. annexed table).

The fabric is introduced into the dyebath at 40° C., the bath is then heated within 30 minutes to 98° C. and this temperature is maintained for 1 hour. The fabric is rinsed with cold water and dried.

EXAMPLE 4

A polycaprolactam fabric bleached in the usual manner is treated at a goods-to-liquor ratio of 1:20 with 0.4 gram/liter of an aqueous dispersion of Compound I at 60° C. for 30 minutes. The treatment provokes an increase of the degree of whiteness by 21%. A similar effect is provoked by Compound III (cf. annexed table).

EXAMPLE 5

A bleached polycaprolactam fabric is treated for 30 minutes at 50° C. and at a goods-to-liquor ratio of 1:20 with 4% of a commercial antistatic agent consisting of a nitrogen containing fatty acid polyglycol ester and 0.6% (referred to the weight of the goods) of an aqueous dispersion of Compound I.

In addition to an increase of the degree of whiteness by 24% this treatment provokes an agreeable soft and smooth handle of the fabric as well as an increased electrical conductivity.

EXAMPLE 6

A bleached polycaprolactam fabric is washed at 60° C. for 15 minutes at a goods-to-liquor ratio of 1:40. 1 liter of the washing bath contains the following components:

0.15 g. of an addition product of one mol of coconut oil alcohol and 5 mols of ethylene oxide,
0.30 g. of an addition product of one mol of coconut oil alcohol and 8 mols of ethylene oxide,
0.18 g. of carboxymethyl cellulose,
0.75 g. of sodium pyrophosphate,
0.50 g. of sodium metasilicate, 0.50 g. of sodium carbonate,
0.75 g. of sodium sulfate and
0.05 g. of an aqueous solution of compound X.

Even after 15 washings no accumulations of the brightener are observed. A pleasant neutral white is obtained.

A concentrated solution of the Compound X can be prepared as follows:

2.7 parts of dimethyl-sulfate are dropped at room temperature and while stirring, into a suspension of 9.5 parts of 1-dimethylamino-propanol-2-addition product (cf. annexed table, Compound VI) in 40 parts of water. The mixture is subsequently heated to 50–60° C. until a homogeneous, weakly acid solution has formed. The latter is stirred with 1 part of charcoal for 15 minutes and filtered; 100 parts of this solution contain 23.3 parts of the Compound X (cf. annexed table).

EXAMPLE 7

A fabric preliminarily bleached with sodium chlorite and consisting of at least 85% of polyacrylonitrile is treated for 30 minutes at 98° C. and a goods-to-liquor ratio of 1:20 with a solution containing per liter:

0.2 gram of an aqueous dispersion of the Compound VIII
0.43 milliliter of formic acid (100% strength) and
0.5 gram of alkylarylpoylglycol ether.

A considerable increase of the degree of whiteness from 81 to 104% is attained.

In the same manner the Compounds IV, V, VI, VII, IX, X and XI (cf. annexed table) can be used. The compound VIII mentioned in Example 7 can be prepared as follows:

A mixture of 30 parts of N-$\beta$-hydroxyethyl-piperidine and 10.5 parts of 1-(4'-vinylsulfonylphenyl)-3-p-chlorophenyl-$\Delta_2$-pyrazoline of a melting point of 190–192° C. is heated while stirred to 70–80° C. At this temperature 0.5 part of sodium hydroxide solution of 33% strength is added. The forming solution is cooled, while stirred, to room temperature and diluted with 60 parts of water. The precipitating reaction product is filtered off with suction, washed with water until showing a neutral reaction and dried at 60° C. under reduced pressure. 13.5 parts of the compound VII (cf. annexed table) are isolated which after having repeatedly been recrystallized from methanol melt at 149–151° C.

EXAMPLE 8

In order to obtain a full and soft handle a cellulose fabric bleached in the usual manner is impregnated, the bath absorption-calculated on the weight of the goods being 80%. The padding bath contains per liter:

20 grams of a copolymer dispersion on the base of vinyl-acetate
10 grams of a polyvinyl-acetate dispersion
15 grams of paraffin
10 grams of an aqueous dispersion of the Compound V.

The fabric is dried in a stream of hot air at 90° C., whereby in addition to the impregnation effect already mentioned an increase of the degree of whiteness from 78 to 102% is simultaneously obtained.

EXAMPLE 9

1 kilogram of caprolactam, 30 grams of water, 4 grams of titanium dioxide, 2 grams of Compound VI (cf. table) are heated under pressure in an autoclave provided with stirrer for 4 hours to 240° C., then for 60 minutes with release. The polyamide melt thus prepared is chilled in water in the form of a band through a nozzle provided with slot, it is then cut and dried. In comparison with a product prepared in the same way but without addition of Compound VI, the crude material shows a considerably increased degree of whiteness. The polymer can be spun to filaments in the usual manner.

TABLE

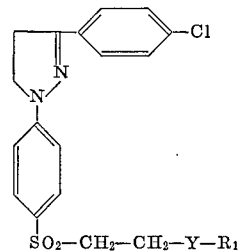

$SO_2-CH_2-CH_2-Y-R_1$

| No. | Y | $R_1$ | Melting point (° C.) |
|---|---|---|---|
| III | S | —⟨phenyl⟩—COOH | 221–223 |
| IV | O | $-CH_2CH_2-N(CH_3)_2$ | 142–144 |
| V | O | $-CH_2CH_2-N(C_2H_5)_2$ | 136–138 |
| VI | O | $-CH(CH_3)-CH_2-N(CH_3)_2$ | 133–135 |
| VII | O | $-CH_2CH_2-N(C_4H_9)_2$ | 105–107 |
| VIII | O | $-CH_2CH_2-N(CH_2CH_2)_2CH_2$ (piperidine) | 149–151 |

TABLE—Continued

| No. | Y | R₁ | Melting point (°C.) |
|-----|---|-----|---------------------|
| IX | O | $-CH_2CH_2-\overset{\overset{CH_3}{\underset{|}{\oplus}}}{\underset{\underset{|}{CH_3}}{N}}-CH_3]^+ OSO_2OCH_3^-$ | |
| X | O | $-\underset{\underset{|}{CH_3}}{CH}-CH_2-\overset{\overset{CH_3}{\underset{|}{\oplus}}}{\underset{\underset{|}{CH_3}}{N}}-CH_3]^+ OSO_2OCH_3^-$ | |
| XI | O | $-CH_2-CH_2-\overset{\oplus}{\underset{\underset{|}{CH_3}}{N}}\begin{smallmatrix}CH_2-CH_2\\ \diagdown\\ CH_2\\ \diagup\\ CH_2-CH_2\end{smallmatrix}]^+ OSO_2-OCH_3^-$ | |

We claim:
1. A Δ₂-pyrazoline compound of the formula

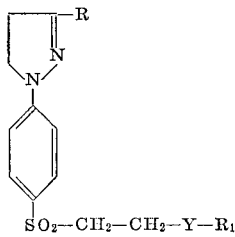

in which R is phenyl or p-chlorophenyl, Y is oxygen or sulfur, and R₁ is alkyl of 1 to 5 carbon atoms substituted by N,N-di-lower-alkyl-amino, quaternary tri-lower-alkyl-ammonium methosulfate, piperidino, piperidinium methosulfate, carboxy or carbo-lower-alkoxy; or phenyl substituted by carboxy or carbo-lower-alkoxy.

2. The compound of the formula

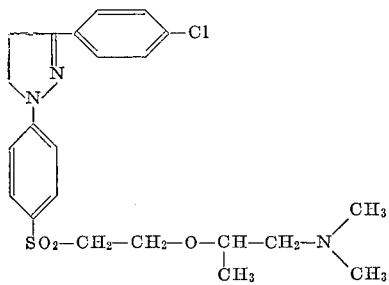

3. The compound of the formula

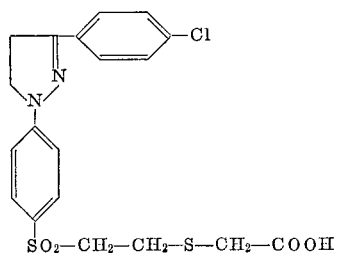

4. The compound of the formula

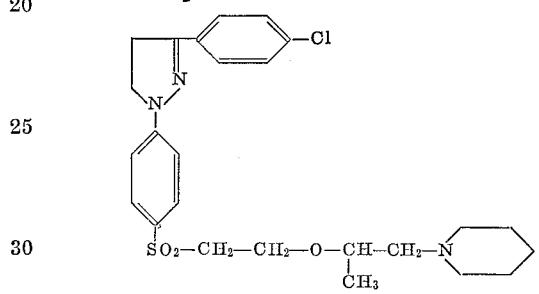

5. The compound of the formula

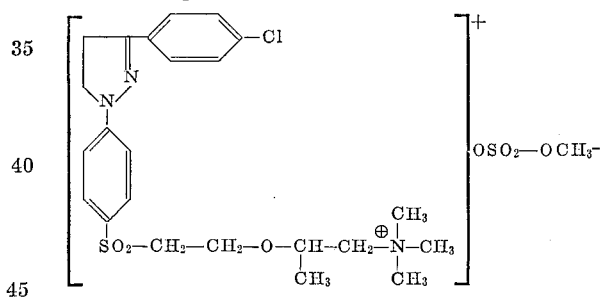

6. The compound of the formula

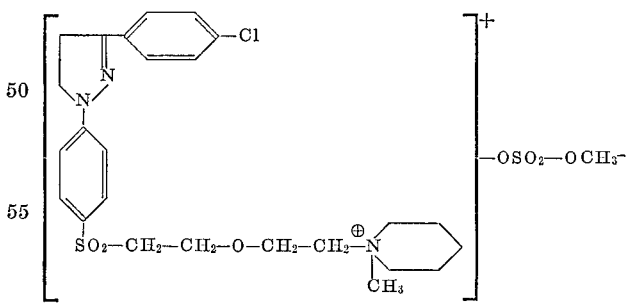

References Cited

UNITED STATES PATENTS 3,378,389  4/1968  Schellhammer et al. __ 117—33.5
3,133,080  5/1964  Sarkar et al. _____ 260—310

FOREIGN PATENTS 372,269  11/1963  Switzerland _____ 260—239.9

NORMA S. MILESTONE, Primary Examiner

C. M. SHURKO, Assistant Examiner

U.S. Cl. X.R.

117—33.5; 252—89; 260—239.9